United States Patent
Oh et al.

(10) Patent No.: US 7,419,521 B2
(45) Date of Patent: Sep. 2, 2008

(54) DUST COLLECTING APPARATUS FOR A VACUUM CLEANER

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 354 days.

(21) Appl. No.: 10/936,137

(22) Filed: Sep. 8, 2004

(65) Prior Publication Data

US 2005/0229554 A1    Oct. 20, 2005

(30) Foreign Application Priority Data

Apr. 16, 2004    (KR) ...................... 10-2004-0026133

(51) Int. Cl.
*B01D 45/12* (2006.01)
(52) U.S. Cl. .............................. 55/337; 55/349; 55/429; 55/459.1; 55/DIG. 3
(58) Field of Classification Search ................... 55/337, 55/346, 349, 429, 459.1, DIG. 3
See application file for complete search history.

(56) References Cited

U.S. PATENT DOCUMENTS

| | | | |
|---|---|---|---|
| 2,575,607 A | | 11/1951 | Wallin |
| 2,904,130 A | * | 9/1959 | Chapler, Jr. ................... 55/344 |
| 4,373,228 A | | 2/1983 | Dyson .......................... 15/350 |
| 4,711,720 A | | 12/1987 | Young |
| 5,537,710 A | | 7/1996 | Selewski et al. |
| 6,279,556 B1 | * | 8/2001 | Busen et al. ................. 123/572 |
| 6,546,593 B2 | * | 4/2003 | Oh et al. ........................ 15/353 |
| 6,702,877 B1 | | 3/2004 | Swanborn ..................... 95/269 |
| 2002/0066366 A1 | | 6/2002 | Conrad et al. |
| 2003/0226232 A1 | | 12/2003 | Hayashi et al. |

FOREIGN PATENT DOCUMENTS

| | | |
|---|---|---|
| DE | AT 204534 | 7/1959 |
| DE | 200 20 167 | 3/2001 |

(Continued)

OTHER PUBLICATIONS

WPI Abstract Accession No. 1997-191498 & SE 9601771 ELECTROLUX AB See abstract and figure depicting two parallel mirror image cyclones for use in a vacuum cleaner. Note inlet 11 which splits into 12a and 12b.

(Continued)

*Primary Examiner*—Robert A Hopkins
(74) *Attorney, Agent, or Firm*—Ladas & Parry LLP (57) ABSTRACT

A dust collecting apparatus for a vacuum cleaner has a first cyclone dust collecting part and a second cyclone dust collecting part that are arranged substantially parallel with respect to an air inflow opening of a vacuum cleaner main body, and may be mirror images of each other. The first cyclone dust collecting part comprises a first suction opening and a first discharge opening, and the second cyclone dust collecting part comprises a second suction opening and a second discharge opening. The first and second suction openings are connected with the air inflow opening of the vacuum cleaner main body, and the first and second discharge openings are connected with a vacuum suction chamber of the vacuum cleaner main body. Accordingly, a dust collecting apparatus for a vacuum cleaner can be realized, having an advanced suction capability and dust separation capability.

15 Claims, 5 Drawing Sheets

FOREIGN PATENT DOCUMENTS

| | | |
|---|---|---|
| DE | 20020167 | 3/2001 |
| EP | 1 023 864 | 8/2000 |
| EP | 1023864 | 8/2000 |
| EP | 1268076 | 10/2004 |
| GB | 2199267 | 7/1988 |
| GB | 2 360 719 | 10/2001 |
| GB | 2360719 | 10/2001 |
| GB | 2363319 | 6/2002 |
| GB | 2374305 | 10/2002 |
| JP | 38-5341 | 5/1961 |
| JP | 3624908 | 5/1961 |
| JP | 61-159932 | 7/1986 |
| JP | 110005043 | 12/1999 |
| JP | 2002-326041 | 11/2002 |
| JP | 2004105538 | 4/2004 |
| JP | 200413700 | 5/2004 |
| JP | 2004135700 | 5/2004 |
| KR | 10081856 | 8/2001 |
| KR | 10087691 | 9/2001 |
| RU | 9 601 771 | 1/1997 |
| SE | 9601771 | 1/1997 |
| WO | WO 0160226 | 8/2001 |

OTHER PUBLICATIONS

Canadian Office Action, Oct. 2004.
WPI Abstract Accession No. 1997-191498 & SE 9601771 ELECTROLUX AB See abstract and figure depicting two parallel mirror image cyclones for use in a vacuum cleaner. Note inlet 11 which splits into 12a and 12b, Jan. 1997.
Second Office Action from the State Intellectual Property Office of China (with English translation) Mar. 23, 2007.

* cited by examiner

DUST COLLECTING APPARATUS FOR A VACUUM CLEANER

CROSS-REFERENCE TO RELATED APPLICATIONS

This application claims the benefit of Korean Patent Application No. 2004-26133 filed on Apr. 16, 2004, in the Korean Intellectual Property Office, the disclosure of which is incorporated herein by reference in its entirety.

BACKGROUND OF THE INVENTION

1. Field of the Invention

The present invention relates generally to a vacuum cleaner and more particularly, to a dust collecting apparatus for a vacuum cleaner for filtering air drawn into the vacuum cleaner to separate dust entrained therein.

2. Description of the Related Art

Generally, a vacuum cleaner draws in external air by use of a suction force generated at a suction motor to collect dust in a collecting means, such as a dust bag. Various types of vacuum cleaners, such as an upright type, a canister type and a stick type are available.

Recently, vacuum cleaners using a cyclone duct collecting apparatus having a semi-permanent life span are experiencing increased use. These types of cyclone vacuum cleaner dust collecting apparatus are used instead of a dust bag, which have a relatively short life span. The cyclone dust collecting apparatus rotates drawn-in air at a high speed to centrifugally separate dust from the air in which it entrained, and it is possible to reuse the cyclone dust collecting apparatus after removing the collected dust as many times as a user wishes.

Figure 1:
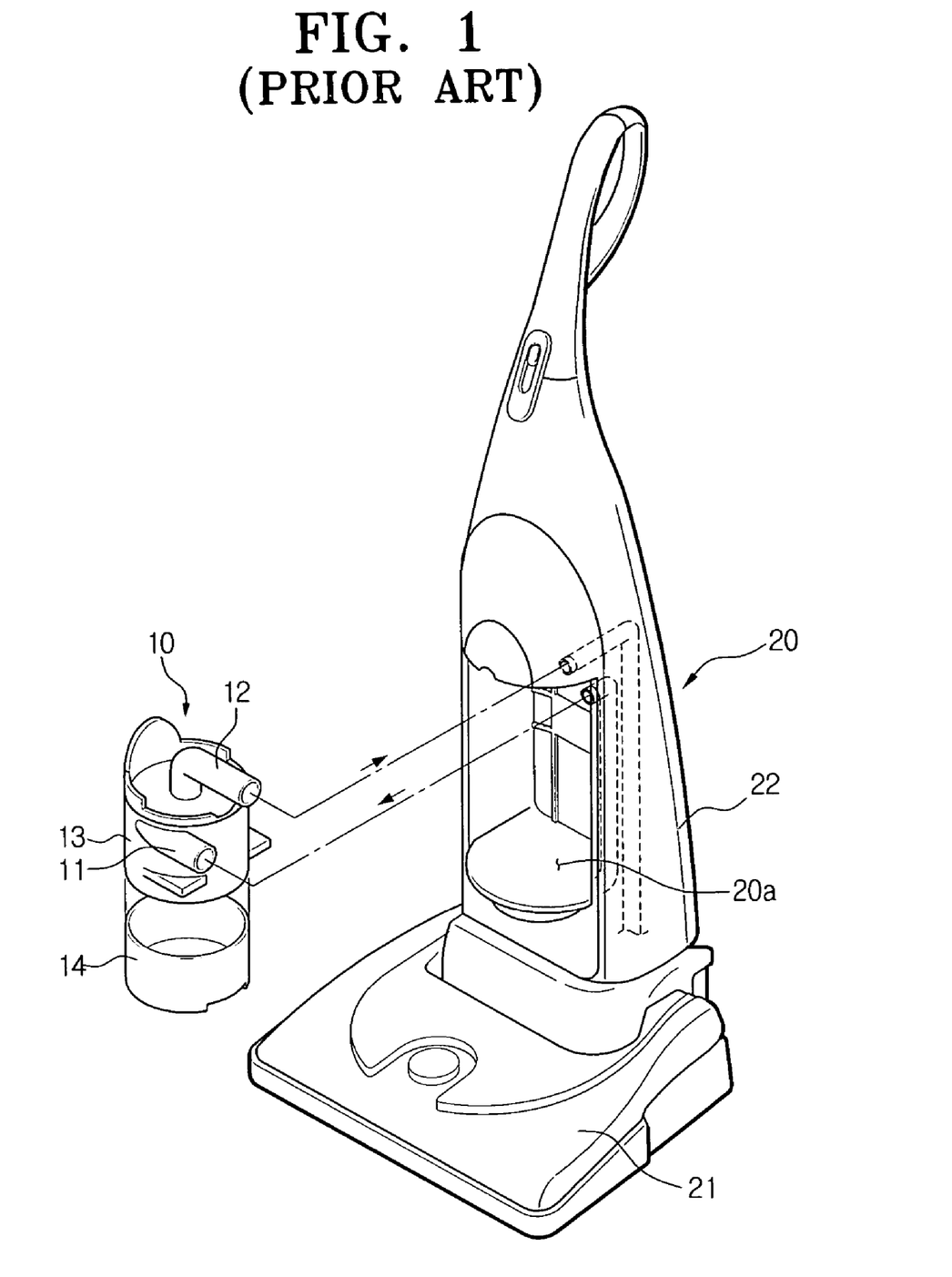
FIG. 1 is a partially exploded, perspective view of an upright-type vacuum cleaner using a conventional cyclone dust collecting apparatus.

FIG. 1 is a partially exploded, perspective view of an upright type vacuum cleaner comprising a conventional cyclone dust collecting apparatus.

Referring to FIG. 1, a conventional cyclone dust collecting apparatus 10 comprises a cyclone main body 13 having a suction pipe 11 and a discharge pipe 12; and a dust collecting receptacle 14 detachably connected with the cyclone main body 13.

When a cyclone dust collecting apparatus 10 is mounted within a dust collecting chamber 20a of an upright-type vacuum cleaner 20, a suction pipe 11 is connected with a suction opening body 21 for drawing in external air, and a discharge pipe 12 is connected with a motor driving chamber (not shown) of a vacuum cleaner main body 22. Accordingly, if a suction motor (not shown) provided in the motor driving chamber is operated, air drawn through the suction opening body 21 flows through the suction pipe 11 such that the air is rotated in the cyclone dust collecting apparatus 10. At this time, any dust entrained in the air is collected in the dust collecting apparatus, and the cleaned air separated from the dust is discharged to a discharge pipe 12.

The conventional cyclone dust collecting apparatus 10 has predetermined length and width dimensions to provide a sufficient space for forming a rotating air stream and for centrifugally separating dust therefrom. Therefore, the cyclone dust collecting apparatus 10 usually has large dimensions such that the vacuum cleaner comprising the cyclone dust collecting apparatus becomes bulky and heavy.

Furthermore, the initial suction force generated at the suction opening body 21 can be reduced due to energy loss exerted in the formation of a rotating air stream at the commencement of vacuum cleaner operation.

SUMMARY OF THE INVENTION

The present invention has been conceived to solve the above-mentioned problems occurring in the prior art vacuum cleaners, and an aspect of the present invention is to provide a compact dust collecting apparatus having improved suction capability and dust separating capability for removable insertion into a vacuum cleaner.

In order to achieve the above aspects, there is provided a dust collecting apparatus for removable insertion into a vacuum cleaner having a first cyclone dust collecting part and a second cyclone dust collecting part being arranged substantially in parallel relation with respect to the air inflow opening of the vacuum cleaner main body. The first cyclone dust collecting part comprises a first suction opening and a first discharge opening, and the second cyclone dust collecting part comprises a second suction opening and a second discharge opening. The first and second suction openings are connected with the air inflow opening, the first and second discharge openings are connected with the vacuum suction chamber of the vacuum cleaner main body.

The dust collecting apparatus having the above characteristic may have the first suction opening having a cross-sectional area substantially of equal size as the cross-sectional of the suction area of the second suction opening, such that the amount of air suction entering into the first and second cyclone dust collecting parts is substantially similar.

The cross-sectional area of each air discharge of the first and second discharge openings may also be substantially the same.

The first and the second suction openings may be a mirror image of each other with respect to the air inflow opening.

The dust collecting apparatus of a vacuum cleaner according to an embodiment of the present invention may comprise a discharge duct for connecting the merged first and second discharge openings to the vacuum suction chamber; and a filter disposed at the discharge duct between the discharge openings and the vacuum suction chamber.

The first and second cyclone dust collecting parts may be a mirror image of each other with respect to the air inflow opening.

A cyclone dust collecting apparatus for a vacuum cleaner according to another embodiment of the present invention comprises a casing having first and second suction openings; a first cyclone dust collecting part connected with the first suction opening and having a first dust separation chamber and a first discharge opening; a second cyclone dust collecting part connected with the second suction opening and having a second dust separation chamber and a second discharge opening; and a lower cover disposed at a lower part of the casing and configured to be detachable therefrom. The lower cover is configured to open and close the first and second dust separation chambers.

A dust collecting apparatus having the above construction according to another embodiment of the present invention may comprise a first dust separation housing wall and a second dust separation housing wall. The first dust separation housing wall partitions one side of the casing into the first dust separation chamber and the first dust collecting chamber, and the second dust separation housing wall partitions the other side of the casing into the second dust separation chamber and the second dust collecting chamber. A first connecting opening is configured in the first dust separation housing wall for connecting the first dust separation chamber and the first dust collecting chamber; and a second connecting opening is configured in the second dust separation housing wall for connecting the second dust separation chamber and the second dust collecting chamber.

The first and second cyclone dust collecting parts may further comprise first and second grill assemblies, respectively.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENTS

Certain preferred embodiments of the present invention will be described in greater detail with reference to the accompanying drawings.

In the following description, the same drawing identification reference numerals are used to designate the same elements throughout the different drawing figures. The disclosure below is intended as merely a detailed construction and description of the elements and is provided to assist in a comprehensive understanding of the invention. Thus, it is apparent that the present invention can be carried out without some or all of these disclosed conventional parts. Also, well-known functions or constructions are not described in detail, since they would obscure the invention in unnecessary detail.

As shown in FIGS. 2 through 6, a dust collecting apparatus for a vacuum cleaner 100 according to an embodiment of the present invention comprises a casing 110, a lower cover 120, first and second cyclone dust collecting parts 130 and 140, and a discharge duct 150.

Figure 2:
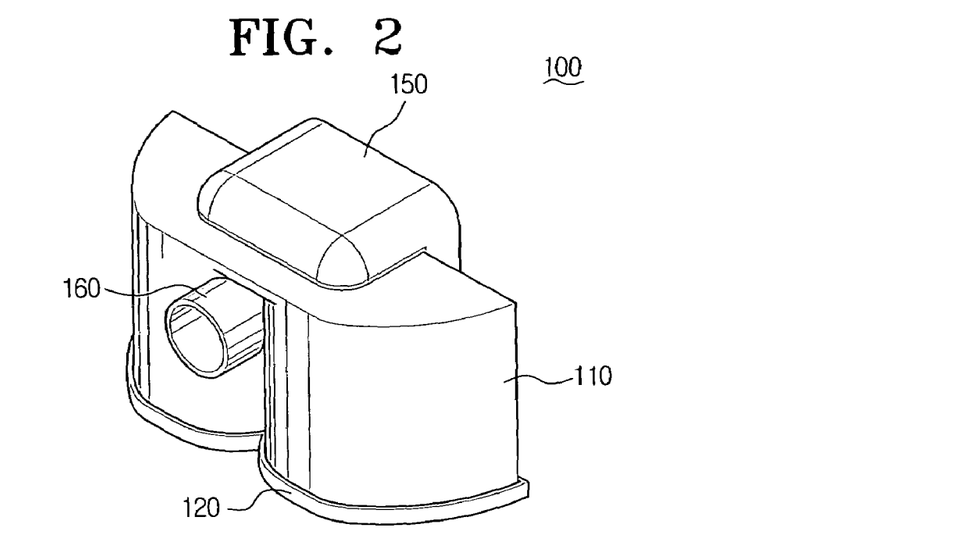
FIG. 2 is a perspective view of a dust collecting apparatus for a vacuum cleaner according to an embodiment of the present invention.
Figure 4:
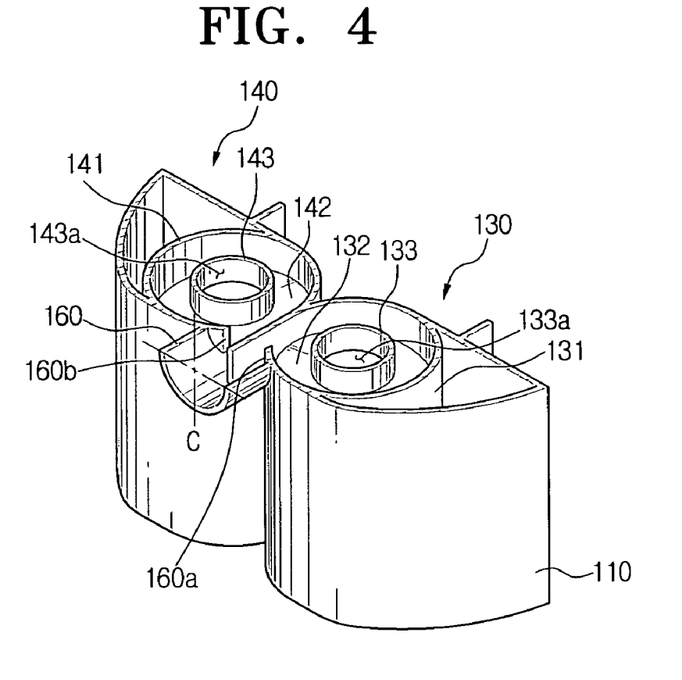
FIG. 4 is a partially cut-away, perspective view of the dust collecting apparatus shown in FIG. 2.

As shown in FIG. 2, the casing 110 forms an external housing for the dust collecting apparatus 100 and comprises a suction pipe 160 disposed at the front thereof. When the dust collecting apparatus 100 is mounted within a vacuum cleaner main body 31 (FIG. 7), the suction pipe 160 is connected with an air inflow opening 31a of the vacuum cleaner main body 31 to provide fluid communication therebetween. As shown in FIG. 4, the suction pipe 160 is separated by a wall into first and second suction openings 160a, 160b, respectively, therein. The first and the second suction openings 160a, 160b preferably are a mirror image of each other with respect to a centerline CL of the suction pipe 160 passing through the wall. Accordingly, the total cross-sectional area of the first and second suction openings 160a, 160b together have substantially the same size as the cross-sectional area of the suction pipe 160.

Figure 3:
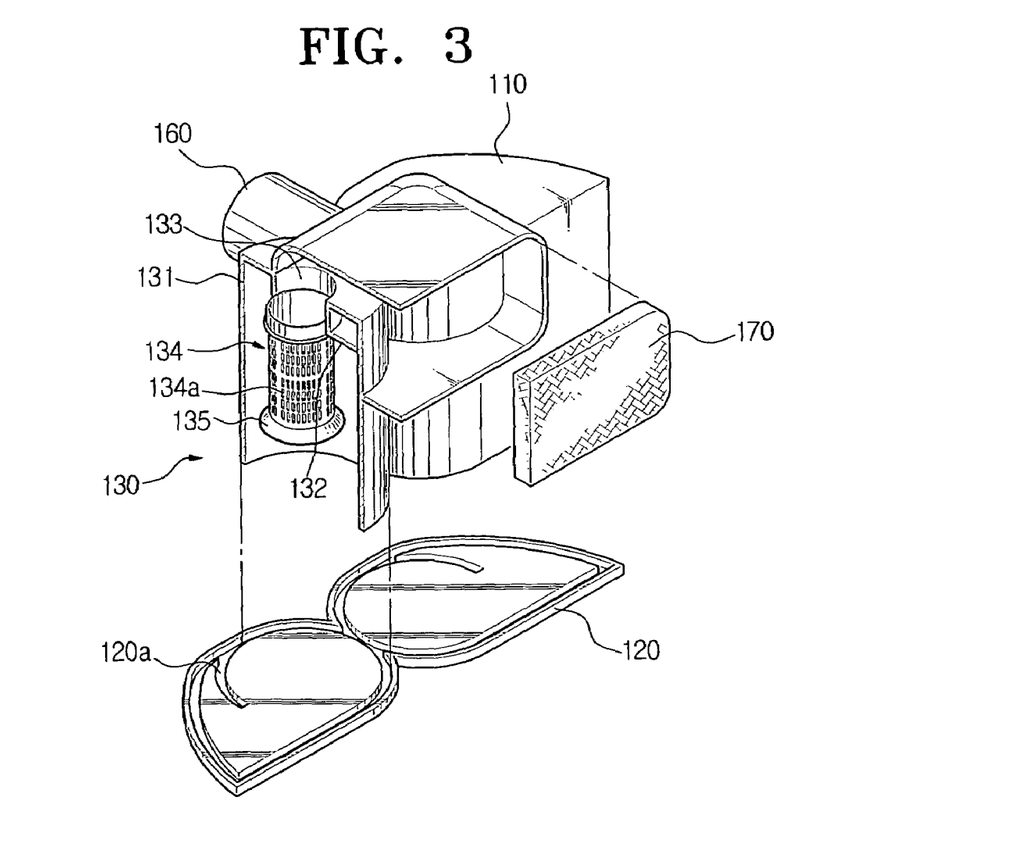
FIG. 3 is an exploded perspective view of the dust collector shown in FIG. 2.

As shown in FIG. 2, the lower cover 120 is detachably attached to a lower part of the casing 110. As shown in FIG. 3, a connecting groove 120a is formed in the upper surface of cover 120.

The first and second cyclone dust collecting parts 130 and 140 are disposed substantially parallel to each other in the casing 110. Specifically, the first cyclone dust collecting part 130 is connected with the first suction opening 160a, and the second cyclone dust collecting part 140 is connected with the second suction opening 160b, and accordingly, air drawn into the suction pipe 160 is divided by the wall to flow into and through the first and second suction openings 160a, 160b such that substantially an equal amount of air flows into the first and second cyclone dust collecting parts 130 and 140.

Figure 5:
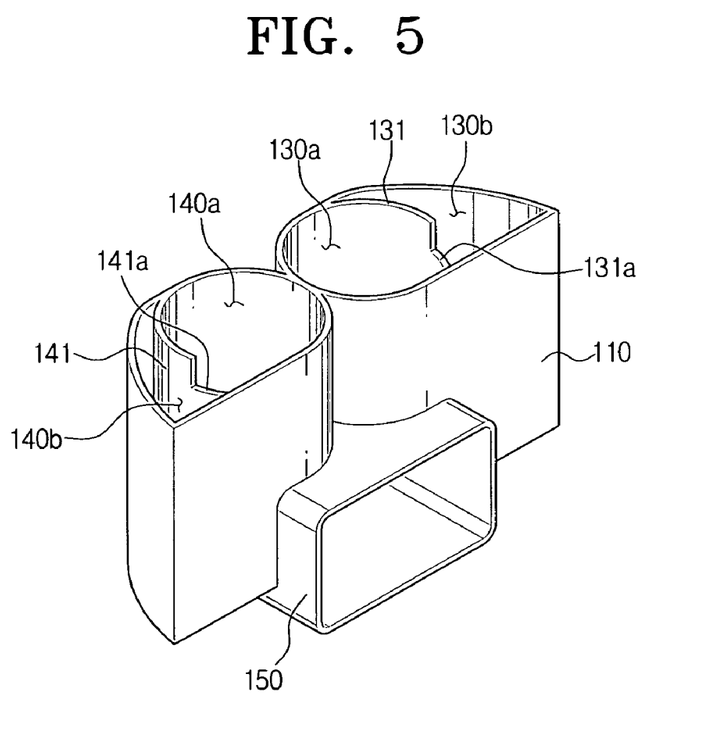
FIG. 5 is a rear perspective view of a portion of the unassembled dust collecting apparatus shown in FIG. 2.
Figure 6:
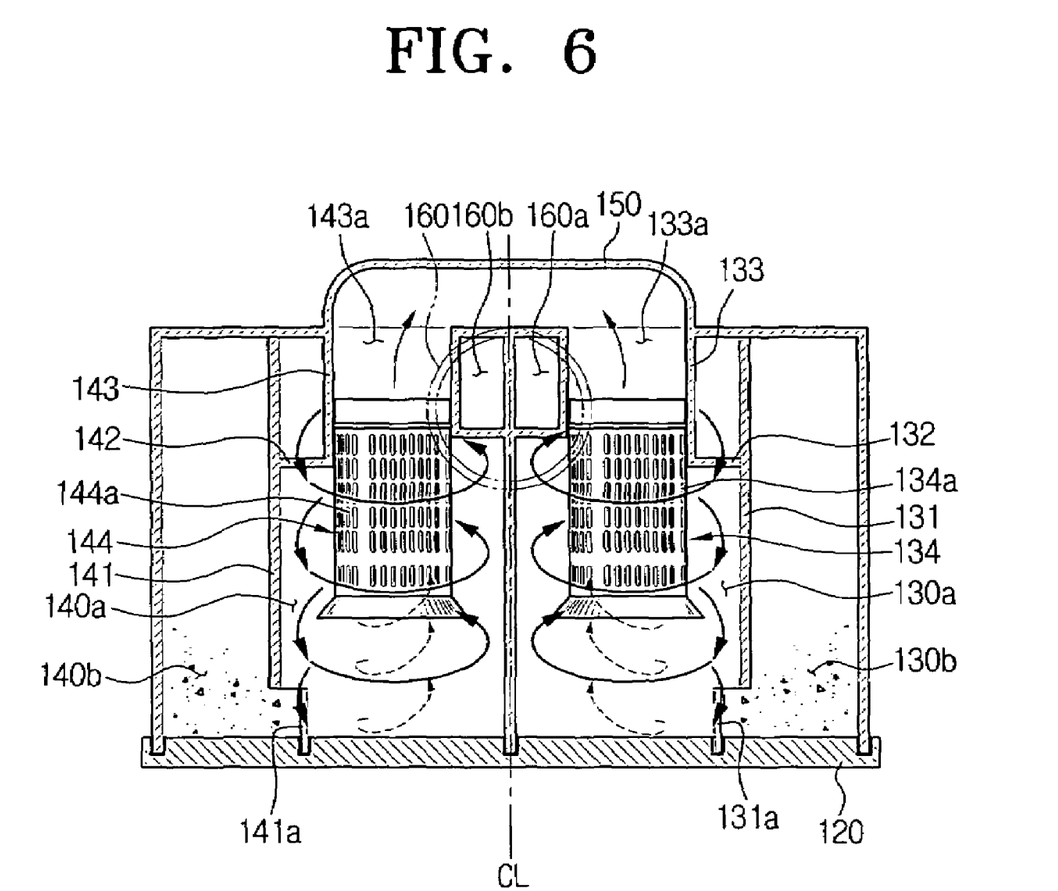
FIG. 6 is a cross-sectional side view illustrating the operation of the dust collecting apparatus shown in FIG. 2.

Referring now to FIGS. 4-6, the first cyclone dust collecting part 130 comprises a first dust separation housing wall 131, an extension of which forms the above-described dividing wall, as shown in FIG. 4, a first dust separation chamber 130a, a first dust collecting chamber 130b, a first air guide member 132, a first discharge pipe 133 and a first grill assembly body 134 (FIG. 6).

The first dust separation housing wall 131 is configured in the shape of a cylinder, and partitions one side of the casing 110, including the suction pipe 160, into two spaces. As shown in FIG. 5, one side of the casing 110 is divided into the first dust separation chamber 130a and the first dust collecting chamber 130b by the first dust separation housing wall 131. As shown in FIG. 5, the first dust separation housing wall 131 has the first connecting opening 131a at one side thereof. The first connecting opening 131a provides fluid communication from the first dust separation chamber 130a to the first dust collecting chamber 130b. Accordingly, dust entrained in the air is separated in the first dust separation chamber 130a and is transferred via the first connecting opening 131a into the first dust collecting chamber 130b, to be collected therein.

Referring now to FIGS. 3, 4 and 6, the first air guide member 132 is configured at an upper part of the first dust separation housing wall 131 to connect to the first suction opening 160a. The first air guide member 132 guides the air to rotate tangentially relative to the annular wall of the first dust separation chamber 130a, such that air drawn in through the first suction opening 160a forms a rotating air stream within the first dust separation chamber 130a.

The first discharge pipe 133 is configured at an upper part of the first dust separation housing wall 131, as shown in FIGS. 3 and 4. The first discharge pipe 133 comprises the first discharge opening 133a, and is configured to discharge the air that has been drawn in toward the first dust separation chamber 130a.

The first grill assembly body 134 is connected to the first discharge pipe 133. The first grill assembly body 134 comprises a plurality of penetrating holes 134a, and a blocking member 135. The blocking member 135 inhibits the dust, entrained in the air circulating in the first dust separation chamber 130a, from entering the discharge opening 133a through the penetrating holes 134a.

The second cyclone dust collecting part 140 has the same structure as the first cyclone dust collecting part 130, but is a mirror image thereof. It comprises a second dust separation housing wall 141, a second dust separation chamber 140a, a second dust collecting chamber 140b, a second air guide member 142, a second discharge pipe 143 and a second grill assembly body 144. Since the connections between the respective elements of the second cyclone dust collecting part 140 and operations thereof are the same as the first cyclone dust collecting part 130, detailed description thereof will be omitted for conciseness.

The first and second cyclone dust collecting parts 130 and 140 are a mirror image of each other about centerline CL with respect to the suction pipe 160. Each constituent member, such as the dust separation chamber and discharge opening, has the same size such that the first cyclone dust collecting part 130 and the second cyclone dust collecting part 140 have the substantially identical suction capability and dust separation capability.

The discharge duct 150 is configured at an upper part of the casing 110 to connect the first and second discharge opening 133a and 143a. When the dust collecting apparatus 100 is mounted within the vacuum cleaner main body 31 (FIG. 7), the discharge duct 150 is connected via a discharge grill part 32 (FIG. 7) to a vacuum suction chamber within a vacuum cleaner main body 31. As shown in FIG. 3, a filter 170 is configured between discharge duct 150 and discharge grill port 32, while providing fluid communication therebetween. The filter 170 operates to filter minute dust particles that are not removed in the cyclone dust collecting parts 130 and 140, and may be made of a suitable material, such as a non-woven fabric or a sponge.

Figure 7:
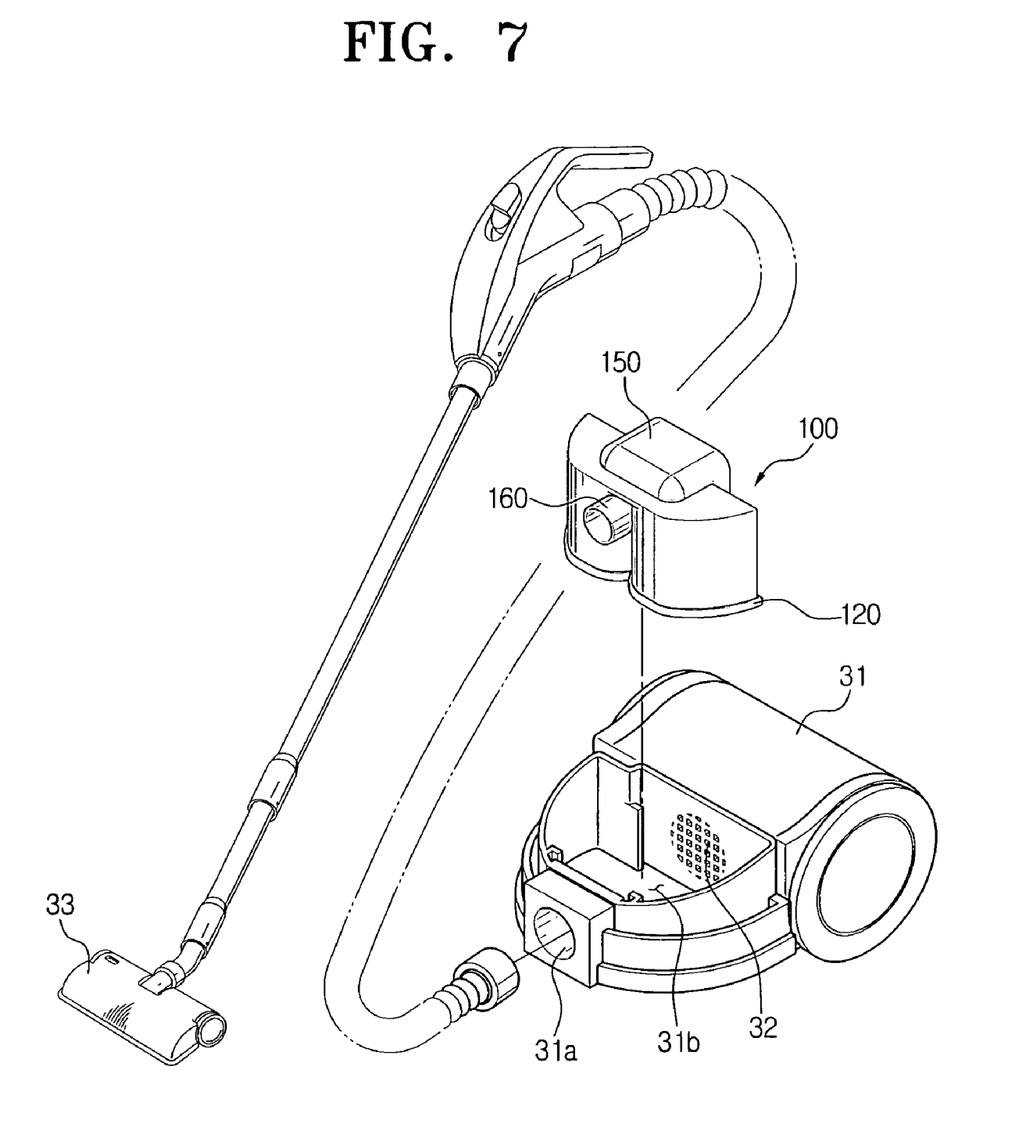
FIG. 7 is a view illustrating how the dust collecting apparatus is mounted in a vacuum cleaner according to the present invention.

The dust collecting apparatus 100 having the above described construction according to an embodiment of the present invention is mounted in a dust collecting chamber 31b of vacuum cleaner main body 31, as shown in FIG. 7. As the dust collecting apparatus 100 is mounted in the dust collecting chamber 31b, the suction pipe 160 becomes connected with the air inflow opening 31a, and the discharge duct 150 becomes connected with the exhaust grill part 32. The exhaust grill part 32 itself is connected to, and is in fluid communication with, a vacuum suction chamber (not shown), in which a suction motor (not shown) is mounted.

When the dust collecting apparatus 100 is mounted in the vacuum cleaner main body 31 and the suction motor is operated, air entrained with dust from a surface to be vacuumed is drawn into the suction opening body 33. The drawn in air is passed through the air inflow opening 31a and the suction pipe 160 and branches at the first and the second suction openings 160a, 160b (FIG. 6) to flow into each cyclone dust collecting part 130 and 140 (FIGS. 4 and 6).

As described in FIG. 6, the air flowing through each suction opening 160a, 160b is guided by air guide members 132, 142 (FIG. 4) of each cyclone dust collecting part 130, 140 such that the air forms a rotating air stream in each dust separation chamber 130a, 140a. At this time, any dust entrained in the air is centrifugally separated to fall to a lower part of the dust separation chambers 130a, 140a along the inner walls of each dust separation housing 131, 141. The dust having fallen to the lower part of the dust separation chambers 130a and 140a is moved to the dirt collecting chambers 130b and 140b via the connecting openings 131a, 141a, by the centrifugal force of the rotating air.

The air separated from the dust in the dust separation chambers 130a, 140a flows out to the discharge openings 133a and 143a via the penetrating holes 134a and 144a of the grill assembly bodies 134 and 144, respectively. The air then flows along the discharge duct 150 to be discharged to outside of the dust collecting apparatus, through the discharge grill part 32 of the vacuum cleaner main body 31 (FIG. 7). While the air is moving along with the discharge duct 150 to the exhaust grill part 32, minute dust particles that are not removed in the cyclone dust collecting parts 130 and 140 are filtered by the filter 170 (FIG. 3).

When the amount of dust collected in the dirt collecting chambers 130b and 140b reaches a level requiring removal, the lower cover 120 is opened to remove the dust collected in the dirt collecting chambers 130b and 140b and the dust is discarded.

The dust collecting apparatus 100 according to the preferred embodiment of the present invention is depicted as being mounted in a canister type vacuum cleaner as an example. However, one will appreciate that the dust collecting apparatus 100 can be applied to other various types of vacuum cleaner configurations, and is not limited to the canister type vacuum cleaner.

As described above, the dust collecting apparatus can become compact-sized due to the parallel arrangement of two cyclone dust collecting parts 130 and 140.

Accordingly, a dust collecting apparatus 100 having an advanced suction capability and dust separation capability can be realized.

Additional advantages, objects, and features of the embodiments of the invention as set forth in part in the preceding description and in part capable of becoming apparent to those having ordinary skill in the art upon examination of the foregoing, or may be learned from practice of the invention. Other objects and advantages of the embodiments of the invention may be realized and attained as particularly pointed out in the appended claims, which together with equivalents thereof, only limit the invention.

What is claimed is:

1. A dust collecting apparatus for a vacuum cleaner, configured for removable insertion into a vacuum cleaner main body which is connected to a vacuum suction chamber for generating a suction force, and having a dust collecting chamber connected with an air inflow opening, the dust collecting apparatus comprising:

a first cyclone dust collecting part and a second cyclone dust collecting part for centrifugally separating dust entrained in the air which is drawn in through the air inflow opening, the first and second cyclone dust collecting parts being formed by first and second cylindrical walls that form first and second cylinders, the first and second cyclone dust collecting parts being arranged substantially in parallel relation with respect to the air inflow opening of the vacuum cleaner main body.

2. The dust collecting apparatus according to claim 1, wherein the first cyclone dust collecting part further comprises:

a first suction opening connected with the air inflow opening; and a first discharge opening connected with the vacuum suction chamber, and the second cyclone dust collecting part comprises:

a second suction opening connected with the air inflow opening; and a second discharge opening connected with the vacuum suction chamber.

3. The dust collecting apparatus according to claim 2, wherein the first suction opening has a cross-sectional area substantially equal size as the cross-sectional of the suction area of the second suction opening.

4. The dust collecting apparatus according to claim 3, wherein the first and the second suction openings are a mirror image of each other with respect to the air inflow opening.

5. The dust collecting apparatus according to claim 2, wherein each of the first and second discharge openings has a substantially similar cross-sectional discharge area.

6. The dust collecting apparatus according to claim 2, wherein the first and second cyclone dust collecting parts are a mirror image of each other with respect to the air inflow opening.

7. A dust collecting apparatus for a vacuum cleaner, configured for removable insertion into a vacuum cleaner main body which is connected to a vacuum suction chamber for generating a suction force, and having a dust collecting chamber connected with an air inflow opening, the dust collecting apparatus comprising:
- a first cyclone dust collecting part and a second cyclone dust collecting part for centrifugally separating dust entrained in the air which is drawn in through the air inflow opening, the first and second cyclone dust collecting parts being arranged substantially in parallel relation with respect to the air inflow opening of the vacuum cleaner main body;
- wherein the first cyclone dust collecting part further comprises:
- a first suction opening connected with the air inflow opening; and
- a first discharge opening connected with the vacuum suction chamber, and wherein the second cyclone dust collecting part comprises:
- a second suction opening connected with the air inflow opening;
- a second discharge opening connected with the vacuum suction chamber; and said dust collecting apparatus further comprises:
- a discharge duct for merging the first and second discharge openings and for connecting the merged discharge opening to the vacuum suction chamber; and
- a filter disposed at the discharge duct between the discharge openings and the vacuum suction chamber.

8. A dust collecting apparatus for a vacuum cleaner, configured for removable insertion into a vacuum cleaner main body which is connected to a vacuum suction chamber for generating a suction force, and having a dust collecting chamber connected with an air inflow opening, the dust collecting apparatus comprising:
- a casing having first and second suction openings connected with and dividing the air inflow opening;
- a first cyclone dust collecting part having a first dust separation chamber and a first discharge opening connected with the vacuum suction chamber, and disposed within the casing configured to connect with the first suction opening;
- a second cyclone dust collecting part having a second dust separation chamber and a second discharge opening connected with the vacuum suction chamber, and disposed within the casing configured to connect with the second suction opening; and
- a lower cover disposed at a lower part of the casing configured to detachably open and close the first and second dust separation chambers.

9. The dust collecting apparatus according to claim 8, wherein the first suction opening has a suction area substantially the same cross-sectional size as that of the suction area of the second suction opening.

10. The dust collecting apparatus according to claim 9 wherein the first and the second suction openings are a mirror image of each other with respect to the air inflow opening.

11. The dust collecting apparatus for a vacuum cleaner according to claim 8, wherein each of the first and second discharge openings has a substantially similar cross-sectional area of the discharge opening.

12. The dust collecting apparatus according to claim 8, comprising:
- a discharge duct for merging the first and the second discharge openings and for connecting the merged discharge openings to the vacuum suction chamber; and
- a filter disposed at the discharge duct between the discharge openings and the vacuum suction chamber.

13. The dust collecting apparatus according to claim 8, wherein the first and second cyclone dust collecting parts are a mirror image of each other with respect to the air inflow opening.

14. The dust collecting apparatus according to claim 8, comprising:
- a first dust separation housing wall for partitioning one side of the casing into the first dust separation chamber and the first dust collecting chamber;
- a first connecting opening configured in the first dust separation housing wall for connecting the first dust separation chamber and the first dust collecting chamber;
- a second dust separation housing wall for partitioning the other side of the casing into the second dust separation chamber and the second dust collecting chamber; and
- a second connecting opening configured in the second dust separation housing wall for connecting the second dust separation chamber and the second dust collecting chamber.

15. The dust collecting apparatus according to claim 8, wherein the first and second cyclone dust collecting parts further comprise first and second grill assemblies, respectively.

* * * * *